US006973053B1

(12) United States Patent
Passman et al.

(10) Patent No.: US 6,973,053 B1
(45) Date of Patent: Dec. 6, 2005

(54) USING DIRECT CLUSTER MEMBER TO CLUSTER MEMBER LINKS TO IMPROVE PERFORMANCE IN MOBILE COMMUNICATION SYSTEMS

(75) Inventors: William S. Passman, Lexington, MA (US); Joseph J. Weinstein, Somerville, MA (US); John R. Zavgren, Acton, MA (US); Brig Barnum Elliott, Arlington, MA (US); Keith W. Manning, Arlington, MA (US); Joanna Kulik, Somerville, MA (US)

(73) Assignee: BBNT Solutions LLC, Cambridge, MA (US)

( * ) Notice: Subject to any disclaimer, the term of this patent is extended or adjusted under 35 U.S.C. 154(b) by 817 days.

(21) Appl. No.: 09/660,521

(22) Filed: Sep. 12, 2000

(51) Int. Cl.⁷ .......................... H04L 12/26; H04J 3/14; G06F 11/00; G08C 15/00; H04B 7/216
(52) U.S. Cl. ..................... 370/310; 370/242; 370/335; 709/227; 455/445
(58) Field of Search ................ 370/233–252, 370/312–342, 410–412; 455/445–450, 522, 455/571; 709/201–227

(56) References Cited

U.S. PATENT DOCUMENTS

| 4,152,647 A | 5/1979 | Gladden et al. |
| 4,284,848 A | 8/1981 | Frost |
| 4,409,687 A | 10/1983 | Berti et al. |
| 4,613,990 A | 9/1986 | Halpern |
| 4,718,002 A | 1/1988 | Carr ........................... 364/200 |
| 4,864,559 A | 9/1989 | Perlman |
| 4,941,200 A | 7/1990 | Leslie et al. |
| 4,999,833 A | 3/1991 | Lee |
| 5,034,967 A | 7/1991 | Cox et al. |
| 5,050,189 A | 9/1991 | Cox et al. |
| 5,093,824 A | 3/1992 | Coan et al. .................... 370/16 |
| 5,155,859 A | 10/1992 | Harris et al. |
| 5,218,356 A | 6/1993 | Knapp |
| 5,243,592 A | 9/1993 | Perlman et al. ............... 370/17 |
| 5,303,286 A | 4/1994 | Wiedeman |
| 5,307,509 A | 4/1994 | Michalon et al. |
| 5,361,399 A | 11/1994 | Linquist et al. |
| 5,363,375 A | 11/1994 | Chuang et al. |

(Continued)

FOREIGN PATENT DOCUMENTS

WO    WO 94/29986    12/1994

OTHER PUBLICATIONS

"Link-State Routing," John Moy, Ch. 5 "Routing in Communications Networks," ed. Martha Steenstrup, Prentice Hall, 1995.

(Continued)

Primary Examiner—Man U. Phan
(74) Attorney, Agent, or Firm—Fish & Neave IP Group Ropes & Gray LLP

(57) ABSTRACT

A communications system has stations arranged in clusters (1a, 1b and 1c) of communication member stations (CM2, CM3, CM6 and CM7), with one member station (CH1, CH4 or CH5) in each cluster being a head station for the cluster. Each member station (CM2, CM3, CM6 and CM7) communicates with the network through a cluster head station (CH1, CH4 or CH5). The cluster head stations (CH1, CH4 and CH5) communicate among other cluster head stations (CH1, CH4 and CH5). A mobile communications station (e.g., CM3) evaluates a beacon message received from a first member station (e.g., CM6) of the plurality of mobile stations through a transceiver 6. The station CM3 also determines whether to communicate with the first member station CM6 directly or to communicate with the first member station CM6 by forwarding messages through a cluster head station CH1 that is affiliated to the mobile communications station CM3.

36 Claims, 10 Drawing Sheets

U.S. PATENT DOCUMENTS

| | | | |
|---|---|---|---|
| 5,371,734 | A | 12/1994 | Fischer |
| 5,491,837 | A * | 2/1996 | Haartsen ...................... 455/62 |
| 5,497,368 | A | 3/1996 | Reijnierse |
| 5,551,056 | A | 8/1996 | Koponen et al. |
| 5,652,751 | A | 7/1997 | Sharony |
| 5,850,592 | A * | 12/1998 | Ramanathan ................... 455/7 |
| 5,881,246 | A | 3/1999 | Crawley et al. ........ 395/200.68 |
| 5,913,921 | A | 6/1999 | Tosey et al. ................. 709/220 |
| 5,966,668 | A | 10/1999 | Lindroth |
| 5,987,011 | A * | 11/1999 | Toh ............................. 370/331 |
| 6,026,077 | A | 2/2000 | Iwata |
| 6,028,857 | A | 2/2000 | Poor ........................... 370/351 |
| 6,046,978 | A | 4/2000 | Melnik |
| 6,049,720 | A | 4/2000 | Rude |
| 6,115,580 | A | 9/2000 | Chuprun |
| 6,205,117 | B1 | 3/2001 | Doshi et al. |
| 6,304,556 | B1 * | 10/2001 | Haas ........................... 370/254 |
| 6,304,745 | B1 | 10/2001 | Monch |
| 6,307,843 | B1 * | 10/2001 | Okanoue .................... 370/312 |
| 6,317,436 | B1 | 11/2001 | Young et al. |
| 6,349,091 | B1 * | 2/2002 | Li ............................... 370/238 |
| 6,430,150 | B1 | 8/2002 | Azuma et al. |
| 6,456,599 | B1 * | 9/2002 | Elliott ........................ 370/254 |
| 6,493,759 | B1 * | 12/2002 | Passman et al. ............ 709/227 |
| 6,512,935 | B1 * | 1/2003 | Redi ........................... 455/574 |
| 6,662,229 | B2 * | 12/2003 | Passman et al. ............ 709/227 |
| 6,711,409 | B1 * | 3/2004 | Zavgren et al. ............. 455/445 |
| 6,735,448 | B1 * | 5/2004 | Krishnamurthy et al. ... 455/522 |
| 6,744,740 | B2 * | 6/2004 | Chen ........................... 370/255 |
| 2002/0082035 | A1 * | 6/2002 | Aihara et al. ............... 455/518 |

OTHER PUBLICATIONS

"Packet Radio Routing," Gregory S. Lauer, Ch. 11, "Routing in Communications Networks," ed. Martha Steenstrup, Prentice Hall, 1995.

"Packet Radio Network Routing Algorithms: A Survey," J.J. Hahn et al., IEEE Communications Magazine, vol. 22, No. 11, Nov. 1984, pp. 41-47.

"The Organization of Computer Resources into a Packet Radio Network," R.E. Kahn, IEEE Trans. On Communications, vol. COM-25, No. 1, Jan. 1977, pp. 169-178.

"Analysis of Routing Strategies for Packet Radio Networks," J.J. Garcia Lune Aceves et al., Proc. Of the IEEE INFOCOM '85, Washington, DC, Mar. 1985, 292-302.

"The DARPA Packet Radio Network Protocols," J. Jubin et al., Proc. Of the IEEE, vol. 75, No. 1, Jan. 1987, pp. 21-32.

* cited by examiner

FORMAT OF A CLUSTER BEACON

FORMAT OF A MEMBER BEACON

USING DIRECT CLUSTER MEMBER TO CLUSTER MEMBER LINKS TO IMPROVE PERFORMANCE IN MOBILE COMMUNICATION SYSTEMS

This invention was made with Government support under Contract No. DAAB07-96-C-C760, awarded by the US Army. The government has certain rights in this invention.

FIELD OF THE INVENTION

The present invention relates generally to an apparatus and method for network communications. More particularly, the present invention relates to a communications network having member stations arranged in clusters, each cluster having a head, with each member station deciding whether to communicate directly with a target member station or to route messages to the target member station through an affiliated cluster head.

RELATED ART

Communications networks can be formed by arranging a plurality of mobile communications stations into a hierarchical configuration including groups (e.g., clusters), with each group having a group or cluster head (e.g., cluster gateway).

An example of such a communications network is disclosed in U.S. Pat. No. 5,850,592, issued to S. Ramanathan on Dec. 15, 1998, and assigned to the same assignee. The U.S. Pat. No. 5,850,592 patent discloses a method for a plurality of mobile stations to automatically organize themselves into a hierarchical network, in which some of the stations operate as message gateways for a cluster of mobile stations.

In the arrangement of the U.S. Pat. No. 5,850,592 patent, a plurality of mobile stations is employed, with each station being able to operate in at least two basic modes. In the first mode, a mobile station serves as a message gateway (e.g., a cluster head or network access point) for a cluster of other member stations (e.g., non-gateway stations). The second mode allows a mobile station to operate as a non-gateway (or cluster member) station. Each mobile station determines which out of the two modes to operate in.

The mobile stations disclosed in the U.S. Pat. No. 5,850,592 patent are capable of operating at two different power levels. When there are no other available cluster heads, the mobile station operates as a cluster head, and transmits at a relatively high power level. The cluster head transmits at the relatively high power level to communicate with other cluster head stations and to typically provide longer distance network links. Although the cluster head communicates at a higher power level with other cluster heads, the cluster head can still communicate with its cluster members using a relatively lower power level. A cluster head can also periodically broadcast a so-called cluster beacon to establish the station's presence and its availability to operate as a cluster head.

Each cluster head station also is equipped to identify whether any other cluster heads are within affiliation range, and if so, to initiate a procedure to terminate operation as a cluster head, if such termination will not excessively reduce connectivity of the network's backbone. Before terminating operation as a cluster head, the cluster head can broadcast a termination request and wait for a predetermined time to see if all members accept the request.

In known systems as exemplified by the U.S. Pat. No. 5,850,592 patent, cluster head stations communicate with each other to form a network backbone, and cluster member stations affiliate with only one cluster head at a time. All network communication for a member station is routed through the affiliated cluster head station. A possible network arrangement is shown in FIGS. 2 and 3, in which areas 1a, 1b and 1c represent individual clusters. As shown in these figures, cluster members CM2, CM3, CM6 and CM7 can affiliate with a single cluster head (e.g., CH1, CH4 or CH5). As shown, CM2 and CM3 are affiliated to a cluster headed by CH1, and CM6 and CM7 are affiliated to a cluster headed by CH5. CH4 is the head of its own cluster. Within a cluster, as shown in FIG. 2, member CM2 communicates with a target co-cluster member CM3 by routing messages through the common cluster head CH1. A target station is a station for whom a message is directed to (e.g., a destination node). Within the network, as shown in FIG. 3, a cluster member CM3 routes messages to CH1, for redistribution through CH5, for a target cluster member CM6. The FIG. 3 routing scheme requires three routing hops (e.g., CM3–CH1, CH1–CH5 and CH5–CM6).

As will be understood by those skilled in the art, various procedures are known for routing messages over a network, even when the configuration of the network may change. For example, link state routing is a well-known routing mechanism. Similarly, there are procedures for measuring or rating the connectivity of a network in a particular configuration, versus alternative configurations that are well known in the art. These types of techniques will not be described in detail herein, however, reference may be had to technical articles including: "Packet Radio Routing," by Gregory S. Lauer in Chapter 11 of "Routing in Communication Networks," ed. Martha E. Steenstrup, Prentice-Hall 1995; "Packet Radio Network Routing Algorithms: A Survey," by J. Hahn and D. Stolle, IEEE Communications Magazine, Vol. 22, No. 11, November 1984, pp. 41–47; "The Organization of Computer Resources into a Packet Radio Network," by R. E. Kahn, IEEE Trans. on Communications, Vol. COM-25, No. 1, January 1977, pp. 169–178; "Analysis of Routing Strategies for Packet Radio Networks," J. Garcia Luna Aceves and N. Shacham, Proc. of the IEEE INFOCOM '85, Washington, D.C., March 1985, 292–302; and "The DARPA Packet Radio Network Protocols," by J. Jubin and J. Tornow, Proc. of the IEEE, Vol. 75, No. 1, January 1987, pp. 21–32. See also U.S. Pat. Nos. 4,718,002, 5,243,592, 5,850,592, 5,881,246, 5,913,921 and 6,028,857 for the general state of the art in wireless network message routing.

In known clustering systems, each cluster member has a cluster head, and all communication traffic to and from a cluster member goes through that cluster head. Such networks limit network bandwidth capabilities and hamper efficiency by requiring all communication to go through a cluster head, even though direct communication between nearby stations may be possible. Requiring that messages always be routed through an affiliated cluster head may cause increased network congestion and produce additional network interference.

These types of problems are not adequately addressed in the art. Thus, there is a need for a flexible communications station in a communications network which can determine whether to communicate directly with a nearby target station, instead of routing messages through an affiliated cluster head for redistribution to the target station. There is another need to provide an adaptive, wireless mobile communications station with the ability to decide which out of an affiliated cluster head or a target cluster member to route messages to.

SUMMARY OF THE INVENTION

The present invention relates generally to using direct cluster member to cluster member links to improve performance in mobile communication systems.

According to the invention, a mobile communications station communicates among a plurality of mobile stations in a network. Stations in the network are arranged in clusters of communication member stations, with one member station in each cluster being a head station for the cluster. Each member station communicates with the network through at least one cluster head station, and the cluster head stations communicate among other cluster head stations.

According to one aspect of the invention, a mobile communications station includes an electronic memory circuit, a transceiver, and an electronic processor circuit. The electronic memory circuit has network information stored therein. The transceiver transmits signals to and receives signals from mobile stations in the network. The electronic processor circuit (i) evaluates a beacon message received from a first member station of the plurality of mobile stations through the transceiver, and (ii) determines whether to communicate with the first member station directly or to communicate with the first member station by routing messages through at least a cluster head station affiliated to the mobile communications station.

In one embodiment, a network communications apparatus includes an electronic memory circuit, an electronic processor circuit, and a transmitter. The electronic memory circuit stores network information. The electronic processor circuit (i) directs communication between the apparatus and an affiliated network gateway and a target node, and (ii) decides which out of the affiliated network gateway and the target node to directly communicate with when transmitting messages for the target node. The transmitter transmits communication messages.

In another embodiment, a method of operating a communications station is provided. The station is in a communications system for communication among plural stations in a network in which stations are arranged in clusters of communication stations with one of the stations being a cluster head in each cluster. The cluster head station communicates among other cluster head stations. The method of operating a communications station includes the steps of: i) receiving a beacon message each from a first station of the plural stations in the network and a cluster head that is affiliated to the communications station; ii) evaluating the beacon messages; and iii) determining whether to directly communicate with the first station or to communicate with the first station by forwarding messages through a cluster head station affiliated to the communications station.

In yet another embodiment, computer executable code stored on a computer readable medium is provided. The code is to operate a communications station so as to communicate among a plurality of mobile stations in a network in which stations are arranged in clusters of communication member stations. One member station is a cluster head station for each cluster. A cluster head station communicates with at least one other cluster head station. The computer executable code includes: i) code to evaluate a beacon received by the communications station from a first member station, and ii) code to route messages, based on an evaluation of the evaluation code, to the first member station through an affiliated cluster head station for distribution to the first member station, or to route messages directly to the first member station.

In still another embodiment, a method for configuring a network of stations is provided. The method relates to a communications system for communication among plural stations in a network in which stations are arranged in clusters of communication member stations each communicating among each other and one of the member stations in each cluster being a head station of the cluster. The cluster head stations communicate with other cluster head stations. The method for configuring the network of stations includes the steps of: i) receiving a beacon issued by a first member station in a second member station of the plural stations; ii) comparing a received signal strength indicator (RSSI) of the received beacon with a predetermined RSSI value; and iii) determining whether the second member station should communicate directly with the first member station based at least in part on a result of a comparison in the comparing step.

In still another embodiment, a method of operating a communications station so as to route a message to a first member station of a plurality of member stations is provided. The method is used in a communications system for communication among the plurality of member stations in which member stations are arranged in clusters of communication member stations with one of the member stations being a cluster head in each cluster. A cluster head station communicates with at least one other cluster head station. The method includes the steps of: (i) receiving a signal from the first member station and determining a received signal strength (RSSI1) for the signal; (ii) receiving a signal from an affiliated cluster head station and determining a received signal strength (RSSI2) for the signal; (iv) determining a value (X) representing a relationship between a maximum received signal strength and a received signal strength for a signal between the first member station and the affiliated cluster head station; and (v) transmitting a signal directly to the first member station when RSSI1>RSSI2−X.

In still another embodiment, a method of operating a communications station so as to route a message to a first member station of a plurality of stations is provided. The method is used in a communications system for communication among the plurality of member stations in which member stations are arranged in clusters of communication member stations with one of the member stations being a cluster head in each cluster. A cluster head station communicates with at least one other cluster head station. The method includes the steps of: (i) approximating an area of interference (A1) caused by a transmission between the communications station and the first member station; (ii) approximating an area of interference (A2) caused by a transmission between the mobile station and an affiliated cluster head station; (iii) approximating an area of interference (A3) caused by routing a message from the affiliated cluster head station to the first member station; and (iv) transmitting a message directly to the first member station when A1<A2+A3.

In another embodiment, a network communications apparatus is provided. The apparatus includes storage means for storing network information. The apparatus also includes directing means for directing communication between the apparatus and an affiliated network gateway or a target node. The apparatus also includes determining means for determining which out of the affiliated network gateway or the target node to directly communicate with when transmitting messages for the target node. The apparatus includes transmitting means for transmitting communication messages.

These and other objects, features and advantages will be apparent from the following description of the preferred embodiments of the present invention.

BRIEF DESCRIPTION OF THE DRAWINGS

The present invention will be more readily understood from a detailed description of the preferred embodiments taken in conjunction with the following figures.

DETAILED DESCRIPTION OF THE PREFERRED EMBODIMENTS

Some ad-hoc wireless networks simplify routing and minimize routing traffic by organizing nodes (e.g., network members) into groups called clusters. A cluster may include a single cluster head and zero or more cluster members. It is an object of the present invention to allow one or more wireless cluster members in a network to determine whether to communicate directly with a target cluster member, or to route messages through an affiliated cluster head for redistribution to the target cluster member.

Preferably, a communication node (or station) determines when it can save resources by transmitting data directly to a destination or target node. When nodes are relatively close to one another, sending one direct message can conserve overall network transmission energy, instead of routing the message through several other nodes for redistribution to a target node. Preferably, the present invention optimizes bandwidth utilization by allowing data traffic to use information about power usage to minimize power when transmitting data from one node to another. A node uses less power to transmit a short distance than is required to transmit over a longer distance. As will be appreciated by those skilled in the art, low-power transmissions generate less network interference than do high-power transmissions.

The preferred embodiments will be described with respect to a wireless mobile communications station and to a network formed by a plurality of similar mobile stations. However, the present invention is not limited to the wireless mobile communications field. Instead, the invention is applicable to many other types of networks, including cellular telephone systems, wireless metropolitan area networks, wireless LANs (e.g., where computer terminals are analogous to cluster members and a base station(s) is analogous to a cluster head(s)), and so forth.

Figure 1:
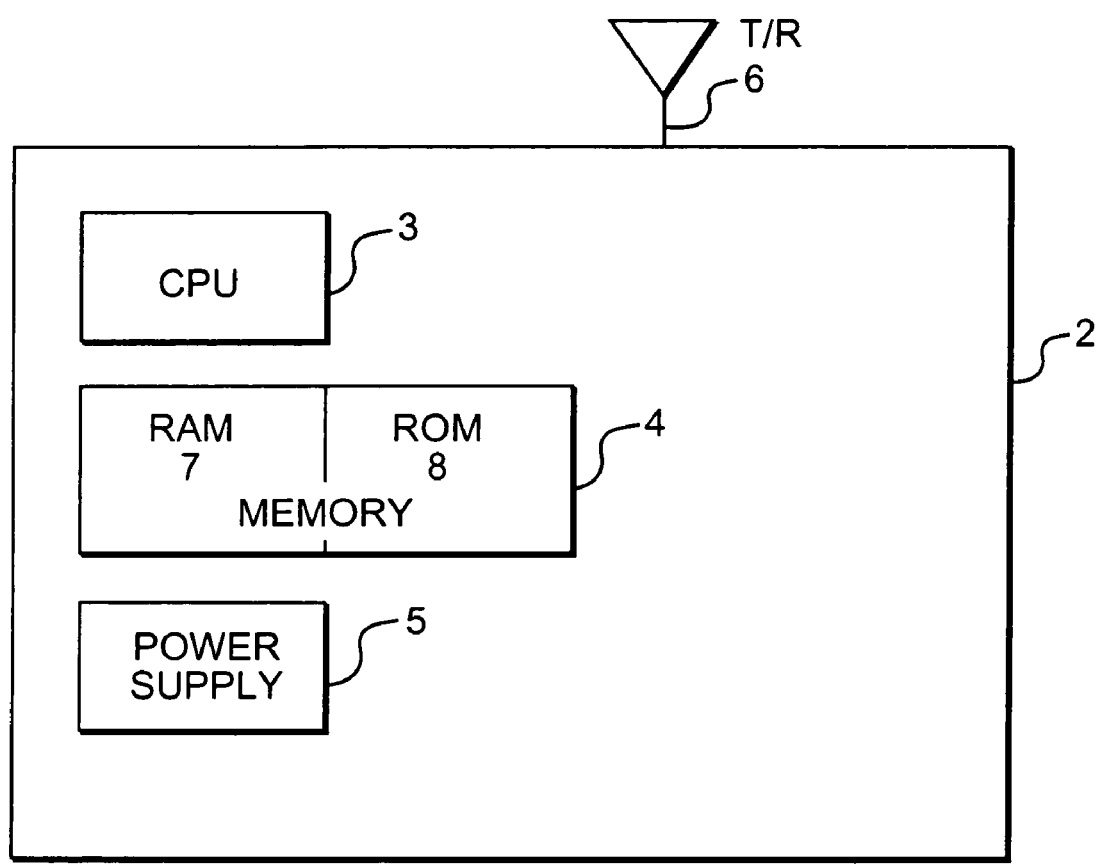
FIG. 1 is a block diagram of a mobile communications station.
Figure 2:
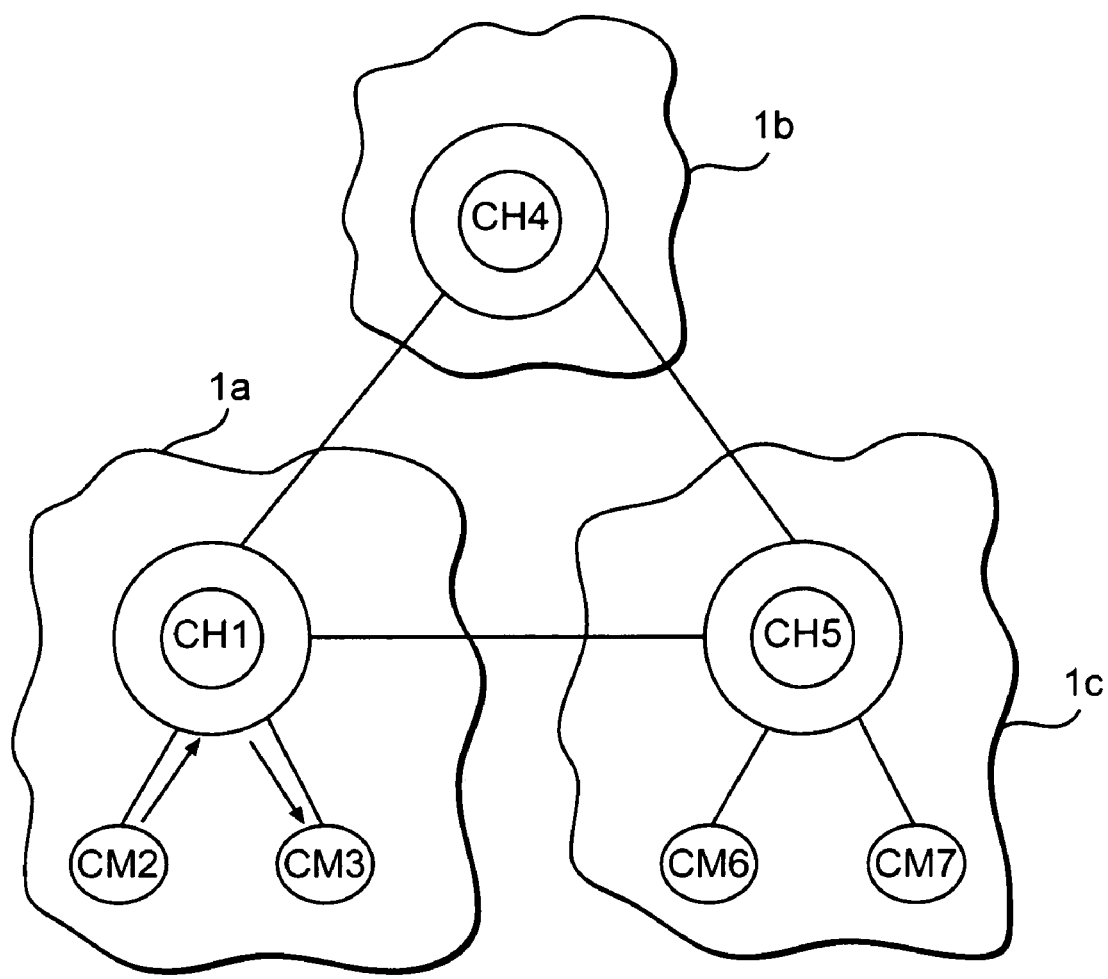
FIG. 2 is a diagram illustrating a conventional routing path between CM2 and CM3 in an arbitrary network configuration.
Figure 3:
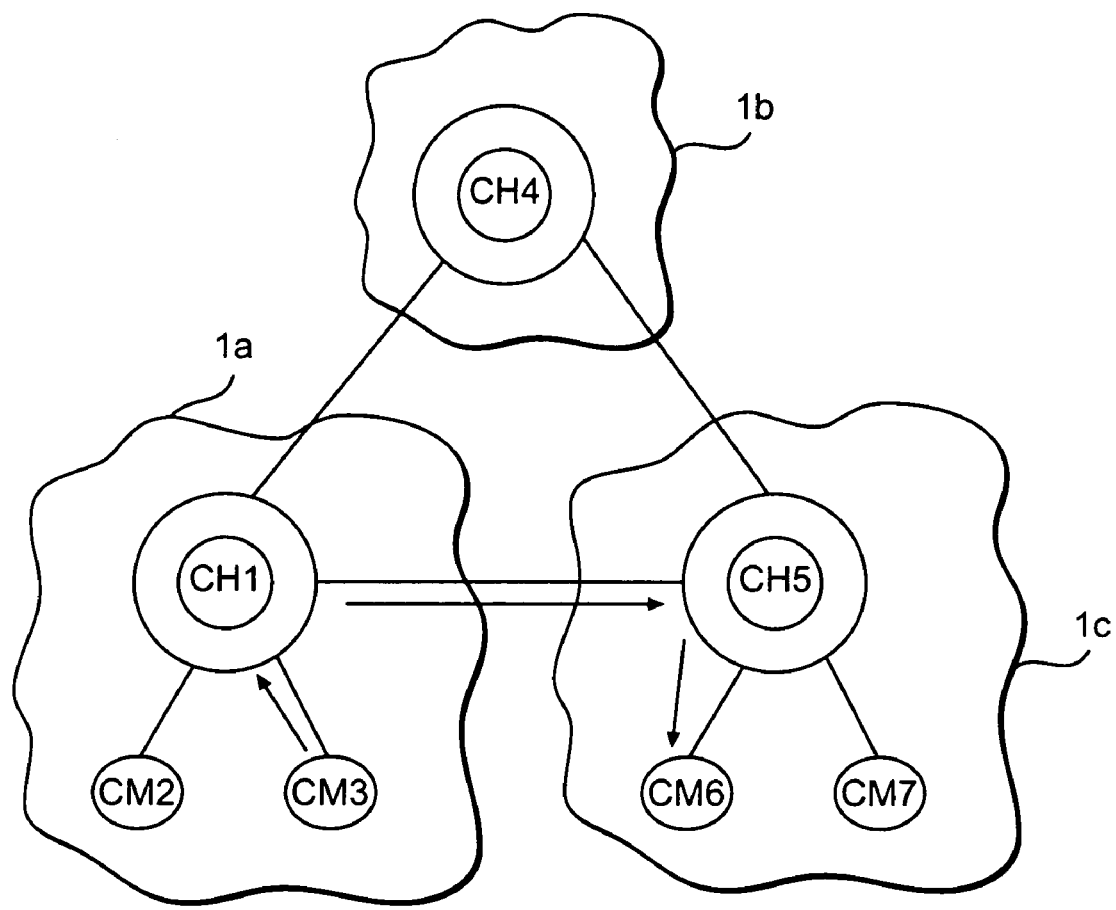
FIG. 3 is a diagram illustrating a conventional routing path between CM3 and CM6 in an arbitrary network configuration.

A wireless mobile communications station 2 is shown in FIG. 1. The mobile station 2 preferably includes a central processing unit (CPU or electronic processor circuit) 3, a memory (or an electronic memory circuit) 4, a power supply 5, a transceiver 6 (e.g., a transmitter and a receiver), RAM 7 and/or ROM 8. The memory 4, RAM 7 and ROM 8 are each suitable for storing computer executable software, databases, data structures, and/or for storing various network information.

As will be appreciated by those skilled in the art, the CPU 3 executes computer executable software in a known manner. As such, the CPU 3 controls the operation of mobile station 2 and implements the methods, procedures and logic of the present invention. The mobile station 2 may also include more than one transmitter and/or more than one receiver for transmitting signals (e.g., RF signals). As will be appreciated by those skilled in the art, many conventional transceivers provide a received signal strength indicator ("RSSI"), and such transceivers may be employed in the present invention. The mobile station 2 can also include an Ethernet interface, as well as other interfacing ports. With these arrangements, the mobile station 2 is able to communicate with mobile stations in the network. Those of ordinary skill in the communications art will realize that other known routing architectures, computing components, and/or routing software may be utilized in accordance with the present invention.

Figure 7:
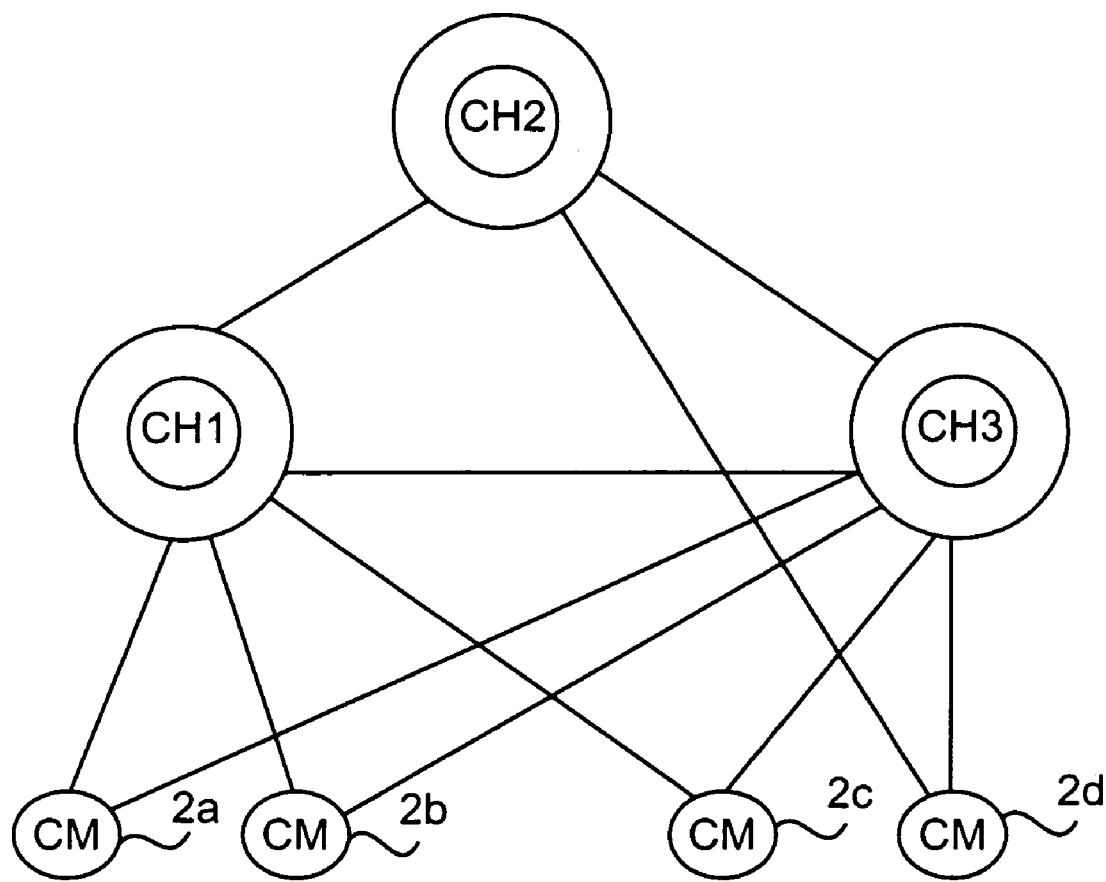
FIG. 7 is a diagram illustrating a multi-affiliation network configuration.

In one embodiment, the mobile station 2 conducts concurrent or simultaneous communication with multiple mobile stations, including multiple cluster heads as shown in FIG. 7. For example, mobile stations 2a, 2b and 2c are illustrated as each being affiliated to clusters headed by CH1 and CH3. Mobile station 2d is affiliated both to a cluster headed by CH2 and to a cluster headed by CH3. Communication with multiple stations can occur, for example, through different channels and subchannels (e.g, different frequencies), and/or by transmitting specific identifying information (or coded information) for each intended source or target. One definition of a channel is a means to communicate so at least two transmissions can proceed simultaneously without interfering with each other.

A "local" channel can be used for communication between a cluster head and affiliated cluster members, for example. Communication between a cluster head and an affiliated cluster member preferably occurs at a network-known, low-power level. Cluster heads can also use the local channel when issuing periodic cluster "beacons." Cluster heads preferably issue cluster beacons at a network-known, high-power level. In the preferred arrangement, each mobile station in the network recognizes that cluster beacons are transmitted at the high-power level. Alternatively, the beacons and local communication messages could each be transmitted at a variable power level.

Figure 8A:
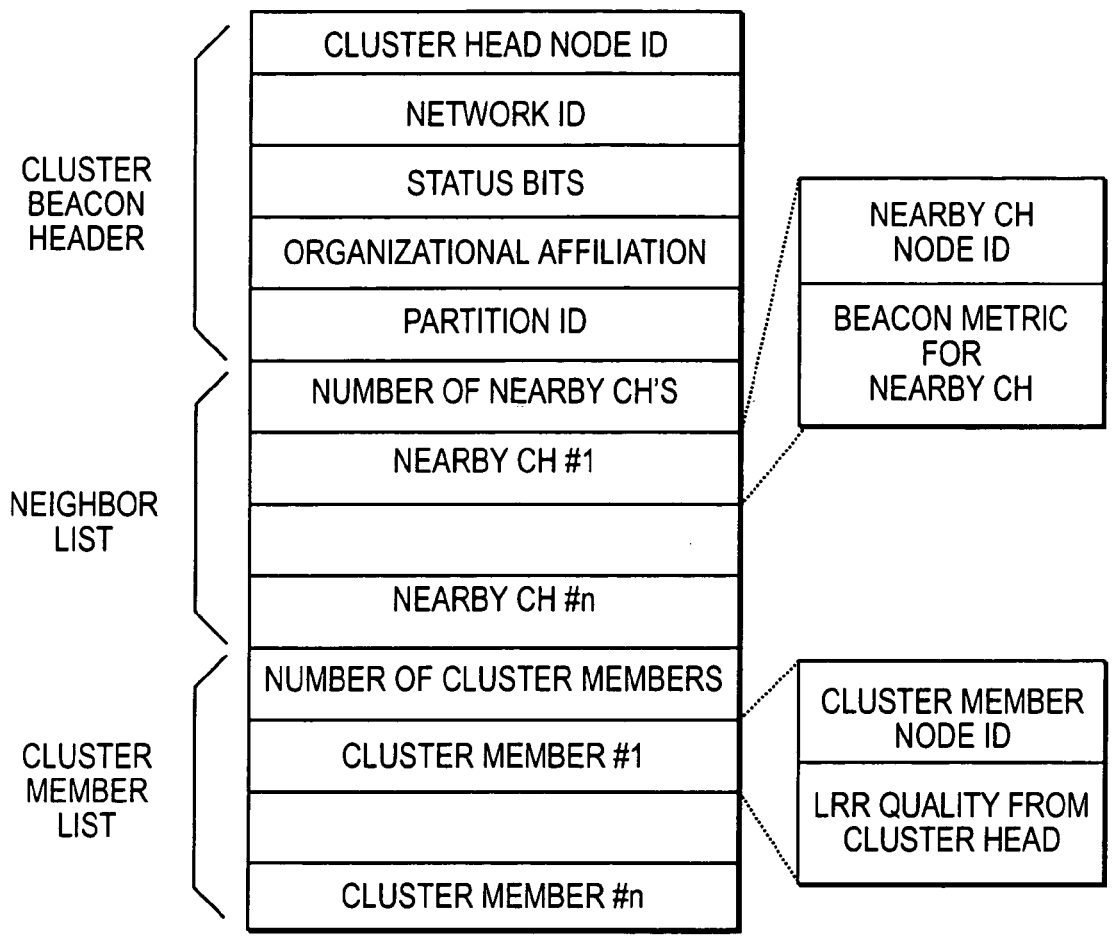
FIGS. 8a and 8b illustrate, respectively, a format of a cluster beacon and a member beacon.

An example of a cluster beacon format is shown in FIG. 8a. Cluster beacons preferably include a cluster beacon header, a neighbor list, and a cluster member list. A cluster beacon header may include a unique cluster head node ID, a network ID, a status field, organizational affiliation, a partition ID, or the like. A neighbor list can include information regarding potential neighbor cluster heads, or information pertaining to affiliated cluster heads. The neighbor list preferably includes an ID and a metric for each identified cluster head.

A metric can be an expression or measure of how "expensive" it is to transmit across one link. Typically, a metric is calculated at the transmitting side of the link. For example, if a link exists between nodes A and B, the metric for a link from A to B is the sum of the cost of being processed at node A and the cost of being transmitted from node A to node B. One cost factor may be the power needed for a transmission. Other factors for determining a metric for a link may include queuing delays at a node, congestion through a node, statistical delay probabilities and/or corruption caused by interference or disruption of a signal, and so forth.

Returning to FIG. 8a, the cluster member list identifies the number of affiliated cluster members and which specific cluster members are affiliated to the issuing cluster head. For each identified cluster member, the neighbor list preferably includes an ID and a metric or quality factor associated with that station.

Mobile stations preferably form a cluster beacon database to help track cluster heads within transmission range. The beacon database can include fields such as cluster head ID, organization matches, beacon strength (or a metric or other factor qualifying the received beacon), a metric synthesizing all other beacon fields into a measure of how Agood a cluster would be to join, etc. A mobile station preferably uses information stored in the cluster beacon database to determine which cluster head (or heads) to affiliate with.

Preferably, mobile station 2 automatically seeks out other mobile stations to form a network, or to join a pre-existing network. The mobile station 2 preferably operates in at least two modes. In the first mode of operation, the mobile station 2 serves as a cluster head (e.g., a network "access point" or "gateway") for other mobile stations. In this capacity, the cluster head is an intermediary between affiliated mobile stations and the network. In the second mode of operation, the mobile station 2 serves as a non-cluster head (e.g., a member of a cluster group). A mobile station preferably gains membership to a cluster group after successfully completing a "handshaking" protocol with the group's cluster head. As discussed, the mobile station can alter its transmission power level for operation in the first or second mode.

Figure 8B:
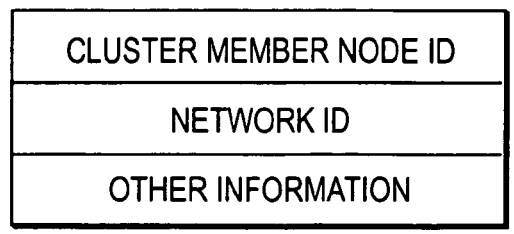

Each cluster member station in the network preferably transmits a member beacon signal. The signal can be transmitted randomly or on a predetermined interval (e.g., every 30 seconds or so). Preferably, the member beacon is transmitted through the local channel at the network-wide, high-power level. An example of a member beacon format is shown in FIG. 8b. As illustrated, the member beacon format includes a cluster member node ID, a network ID, and a field for other information. The cluster member node ID is a unique identifier representing the issuing station. The network ID identifies the network with which the station is associated. The "other information" field can contain information regarding a network partition, a power transmission level reference, and/or current affiliation status, etc. Mobile station 2 preferably collects and stores member beacons in a member beacon database (or other data structure). Mobile station 2 may store beacon messages in the database according to member station ID, which is transmitted in a member beacon.

Figure 6:
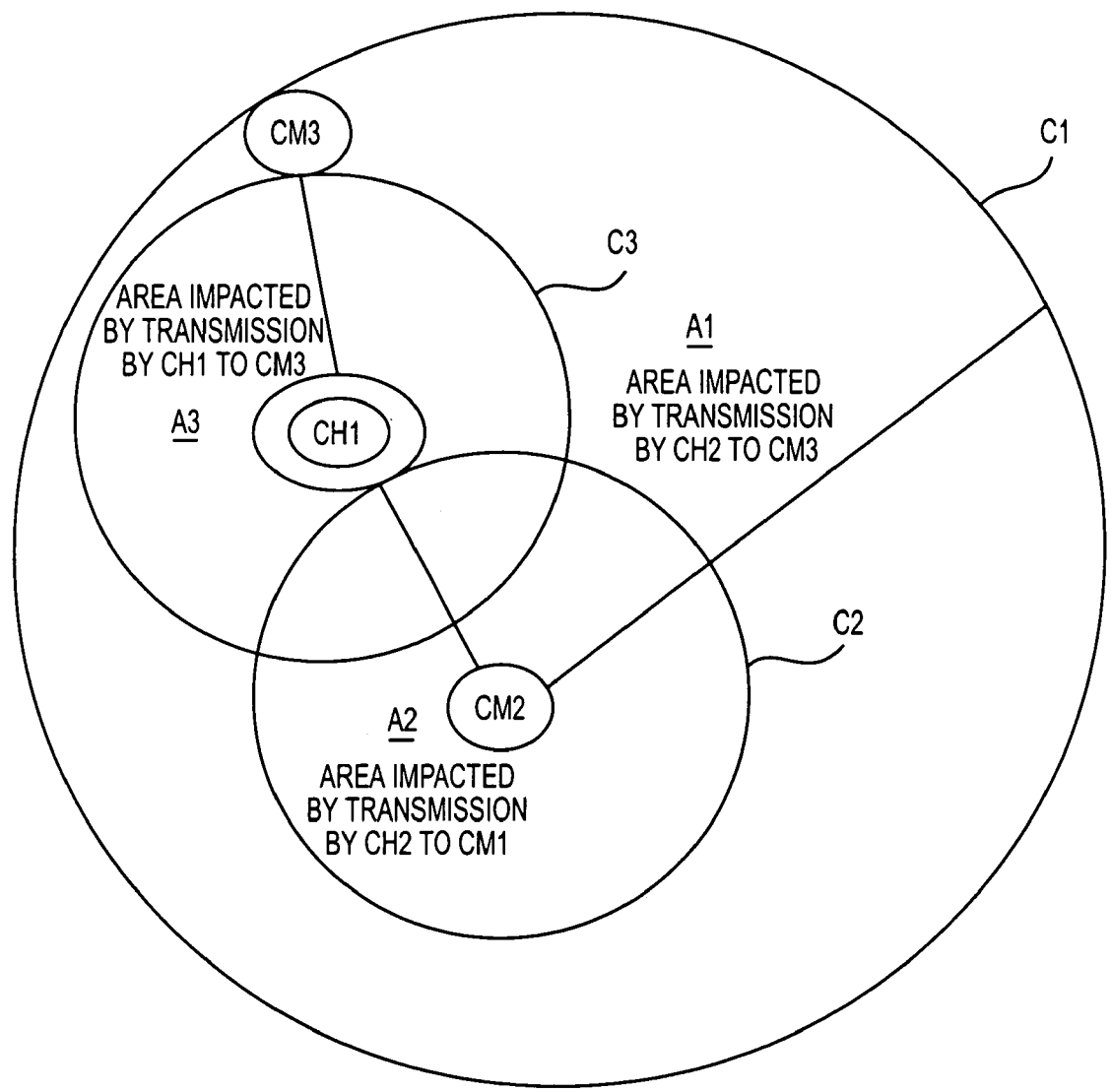
FIG. 6 is a diagram illustrating relative areas impacted by radio transmissions.

The concepts of the preferred embodiment provide enhanced network bandwidth optimization. For example, using multiple hops can use less power (and cause less interference) in a wireless mobile network, than a single hop at a high-power transmission level. As shown in FIG. 6, two low-power transmissions between CM2–CH1 and CH1–CM3 may have a combined lower network area of impact (A2 and A3), than an area of impact (A1) of a single high power hop between CM2 and CM3. An area of impact (or "affected area") represents an area of potential network interference caused by a transmission.

Power transmissions are analogous to "conversations" in a room. For example, using a low power transmission is analogous to people whispering in a room. Using a high power transmission is analogous to a person shouting in the room. As will be appreciated, many simultaneous conversations can take place in the room when people whisper. However, if a person shouts, all other conversations are interfered with, resulting in a lower "conversation" bandwidth.

Figure 4:
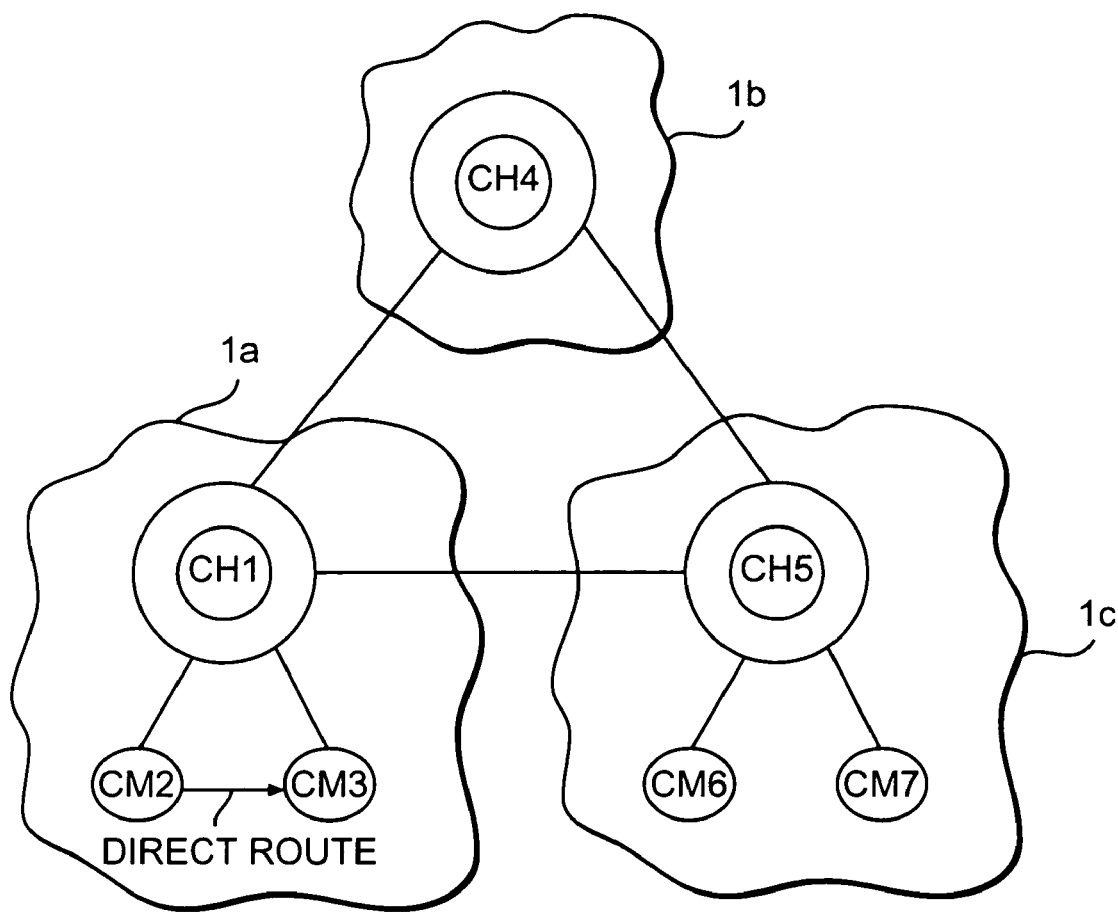
FIG. 4 is a diagram illustrating a routing path according to the present invention.
Figure 5:
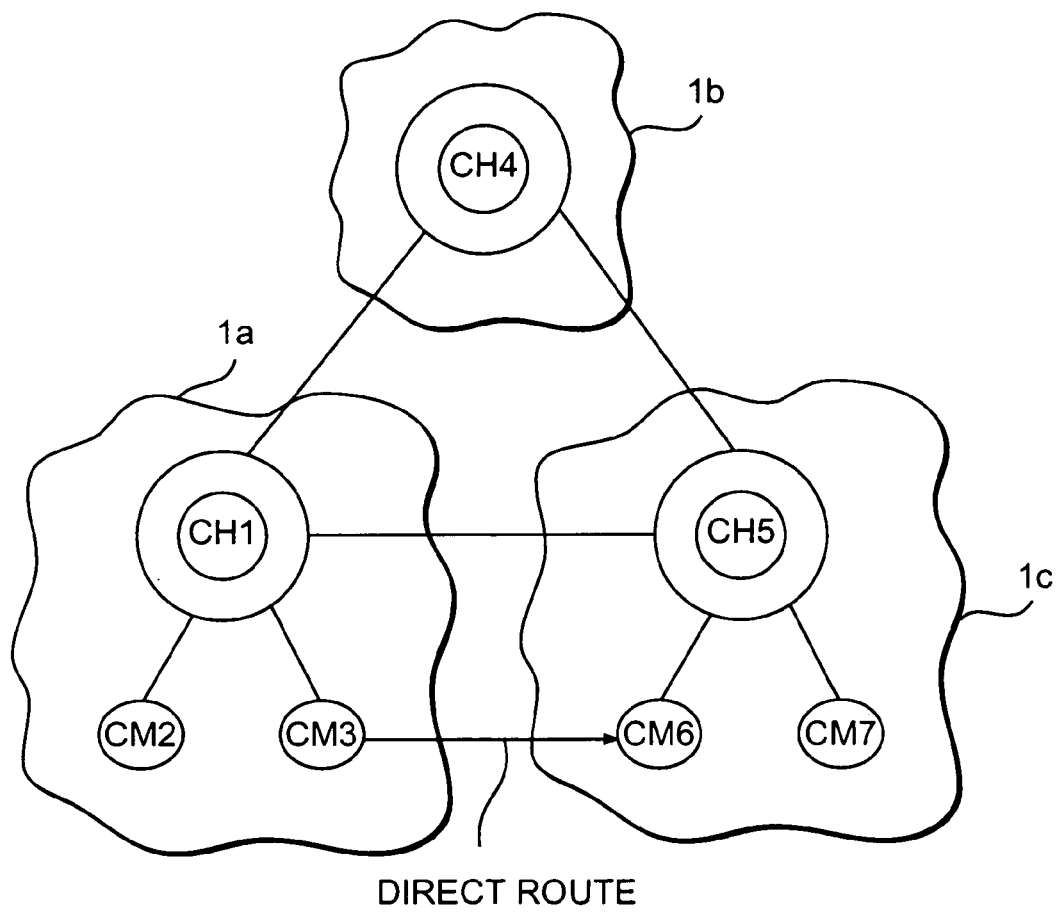
FIG. 5 is a diagram illustrating a routing path according to the present invention.

Similarly, in a preferred embodiment, mobile station 2 uses transmission power information to optimize network bandwidth. In this regard, mobile station 2 decides whether to communicate directly with a target mobile station or to route messages for the target station through an affiliated cluster head. For example, as shown in FIG. 4, CM2 may decide to transmit directly to CM3, instead of routing messages through CH1. Similarly, as shown in FIG. 5, CM3 may decide to communicate or transmit signals directly to CM6, instead of routing a message through CH1 and CH5. Preferably, direct cluster member to cluster member communication occurs at the network-wide, low-power level over the local channel. Alternatively, cluster member to cluster member communication occurs at a variable power level. The variable power level can be set to ensure a successful transmission and/or to minimize network interference, for example.

Figure 9:
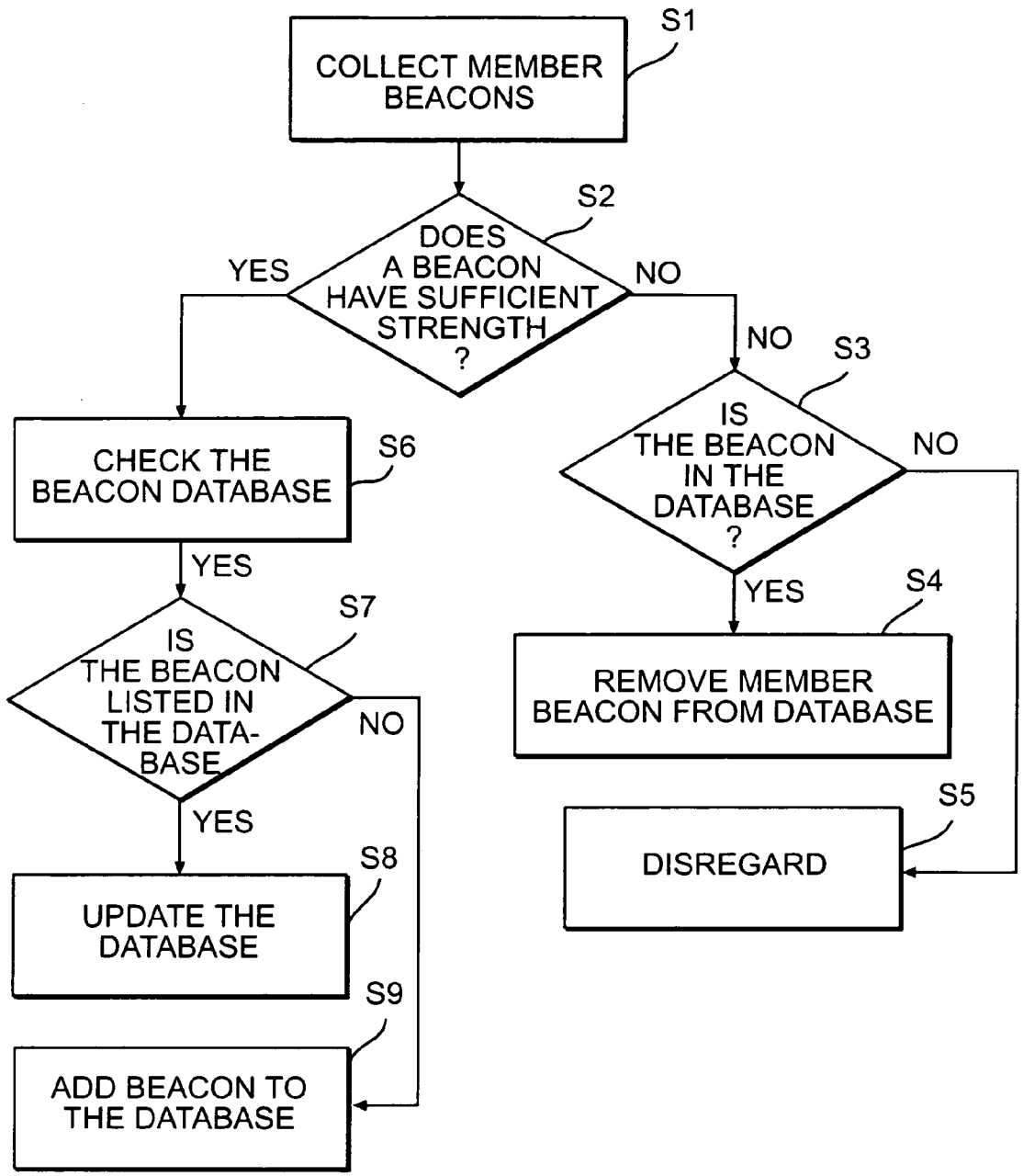
FIG. 9 is a flow diagram illustrating an operational aspect of the present invention.

An example of a preferred operational aspect of mobile station 2 will be described with reference to FIGS. 9 and 10. As shown in FIG. 9, mobile station 2 monitors the local channel and collects member beacons (S1). The transmission power characteristics of a received member beacon are evaluated. In a preferred embodiment, the mobile station 2 determines if the beacon message has sufficient signal strength (S2). Sufficient strength is preferably determined by comparing a received signal strength indicator ("RSSI") against a predetermined RSSI threshold, for example. In general, as will be appreciated by those skilled in the art, an RSSI can represent a value that is proportional (or otherwise related) to a known signal strength attained by measuring a received signal. A low RSSI value implies a relatively weak received signal. In a preferred embodiment, a member beacon RSSI is a digital value that is proportional to the known member beacon signal power level (e.g., the highest power level) attained by measuring the received signal strength of the member beacon. Additionally, a cluster beacon RSSI is a digital value that is proportional to the known cluster beacon power lever (e.g., the highest power level) attained by measuring the received signal strength of the cluster beacon. Alternatively, when beacons are transmitted at a variable power level, a transmission power reference could be included in the beacons. A receiving node could then use the power reference to calculate or otherwise determine an RSSI for the signal.

The predetermined RSSI threshold value can be selected to indicate that the receiving station must necessarily respond at the highest power level, since the received signal is so weak (e.g., the target station is far away). If the received beacon does not have sufficient strength (e.g., the signal strength is below the RSSI threshold), the mobile station 2 checks its member beacon database to determine if a particular member station has previously issued an acceptable beacon message (S3). Mobile station 2 preferably removes a beacon message from the database if one is found (S4).

The beacon message is removed since the mobile station would be required to transmit at the highest power level to reach the target station (e.g., since the new beacon was below the RSSI threshold value). As discussed above, transmitting at the highest power level may cause a relatively large area of interference. If the mobile station 2 is not listed in the database, the received beacon is ignored or otherwise discarded (S5).

If the received signal has an RSSI above the threshold level, the mobile station 2 checks the member beacon database (S6) and determines whether a member beacon of the transmitting member station has been previously stored (e.g., listed) in the database (S7). If the member station is listed in the database, the mobile station updates the RSSI information for the received beacon message (S8). In this manner, the mobile station 2 ensures that the database contains fresh information, for example. The transmitting mobile station (and beacon information) is added to the database if it is not already listed therein (S9).

As will be appreciated by those skilled in the art, time-series statistical processing, e.g., moving averages, can also be used to process the RSSI information. This processing can be accomplished using known low-pass filters, finite impulse response (FIR) modules, or signal processing software. A moving RSSI average could then be used as the reference RSSI value, for example, in steps S2, S8 and/or S13.

In a preferred embodiment, each member station determines whether to transmit messages directly to a target member station, or to route messages to the target station through an affiliated cluster head. FIG. 10 is a flow diagram illustrating a preferred routing procedure.

In step S10, the mobile station identifies a target member station in which a message is intended. As will be appreciated by those skilled in the art, the mobile station 2 identifies a target node through a unique node ID, or through characteristics derived based on available network topology, for example.

The mobile station determines whether the target member station is listed in the member station database (S11). If the station is not listed, the mobile station routes messages through an affiliated cluster head (S12), as discussed below. A target station will not be listed in the database for several reasons, including: i) the mobile station 2 did not receive a member beacon from the target station; and ii) the mobile station 2 received a beacon message from the target station, but the RSSI (or RSSI average) of the member beacon was below the predetermined threshold level. If the target station is listed in the database, the mobile station 2 determines whether transmission requirements are met (S13). If the requirements are met, the mobile station communicates directly with the target node or station (S15). As will be appreciated by those skilled in the art, the mobile station 2 can engage in a "handshaking" protocol with the target station prior to transmitting data. Handshaking ensures that both stations are ready and able to proceed with communication. If the characteristics are not met, the mobile station routes messages through an affiliated cluster head for redistribution to the target station (S14).

A preferred determination procedure of step S13 will now be explained in even further detail. Generally, if a target cluster member is within the RSSI threshold, but is still "much" further away than an affiliated cluster head, the mobile station will transmit through the cluster head to decrease overall network interference. "Much" in this context can be defined in terms of power-to-reach the target station, in view of power-to-reach the cluster of head, plus adjustment factors. In one embodiment, the power-to-reach the target member is approximately a network maximum RSSI value minus an actual RSSI value.

In FIG. 6, three circles C1, C2 and C3 define areas A1, A2 and A3, respectively, where nodes can hear radio signals from a transmitting node at a power level chosen to reach a destination node. Areas A2 and A3 also represent affected areas from a message relayed from CM2 to CH1, and then from CH1 to CM3, respectively. Area A1 represents an area affected from a message transmitted directly from CM2 to CM3. Typically, when one node is transmitting, other nodes within a corresponding affected area are unable to successfully transmit at the same time due to interference. As will be appreciated by those skilled in the art, actual radio propagation patterns are, in general, not shaped as circles or convex hulls. Instead, radio propagation patterns are often shaped like the petals of a daisy.

The following example considers a situation where CM2 determines whether to transmit a message directly to CM3 or to relay the message via CH1. As will be appreciated, network bandwidth can be optimized when affected areas from a transmission are minimized. One procedure achieves this objective by preferably determining:

If
(the area affected by a direct transmission between CM2 and CM3) is less than (the area affected by a transmission between CM2 and CH1) plus (the area affected by a transmission between CH1 and CM3),
then
send the message directly between CM2 and CM3,
otherwise
send the message via CH1.

A more complete description would also factor in other types of "costs." One example of a cost is a delay associated with an acknowledgement of a direct communication. Delays caused by time and channel access may also be cost factors. For example, a transmitting station may need to request channel access prior to transmitting. One procedure factoring in such costs is:

If
$A1 < (A2 + A3) + \text{cost}$,
then
send the message directly between CM2 and CM3,
otherwise
send the message via the CH1, where A1 is an area affected by a direct transmission between CM2 and CM3, A2 is an area affected by a transmission between CM2 and CH1, and A3 is an area affected by a transmission between CH1 and CM3.

As will be appreciated, areas A1, A2 and A3 are difficult, if not impossible, to actually measure in mobile ad-hoc networks. However, comparing a received signal strength (RSSI) for a node's transmissions can make a useful approximation of the affected areas. In this case, RSSI is a received signal strength. A low RSSI indicates that a node is far away. The highest possible (e.g., network-wide) received signal strength (e.g., "MaximumRSSI") indicates that a node is very close. If a node is nearby, a message can be transmitted at a lower power level. If a node is far away, then the message must be transmitted at a higher power. Thus, "MaximumRSSI−RSSI" can estimate the power used (and the resulting interference) to reach a destination node.

The following variables can be used when approximating the above-mentioned procedure.

RSSI1=the received signal strength from CM2–CM3 (e.g., CM2 receiving a beacon from CM3).

RSSI2=the received signal strength from CM2–CH1 (e.g., CM2 receiving a beacon from CH1).

RSSI3=the received signal strength from CH1–CM3 (e.g., CH1 receiving a beacon from CM3).

With these definitions, the following approximations are readily made.

A1=(MaximumRSSI−RSSI1)
A2=(MaximumRSSI−RSSI2)
A3=(MaximumRSSI−RSSI3).

In an ad-hoc network, however, node CM2 may not know RSSI3. Accordingly, CM2 can approximate RSSI3, for example, by using a fraction of the MaximumRSSI value (e.g., a midpoint RSSI value of "MaximumRSSI/2," or another faction of the MaximumRSSI value, such as "MaximumRSSI/5," "MaximumRSSI/3," etc.). This approximation can be determined by accessing a predetermined value or by computing a value based on network information and/or acceptable interference levels, for example.

Thus, the procedure (without a cost variable) condenses to:

If
   A1<A2+A3
     which is approximated by:
     (MaximumRSSI−RSSI1)<
      (MaximumRSSI−RSSI2)+
     (MaximumRSSI−MaximumRSSI/2); which is equivalent to:
     RSSI1>(RSSI2−MaximumRSSI/2)
then
   send the message directly between CM2 and CM3, otherwise
   send the message via CH1.

In general, this procedure translates into a strategy where if the transmission power required for transmission between the mobile station 2 and the target station is less than a transmission power required between the mobile station and the cluster head, plus an adder representing a fraction of the maximum transmission power of a mobile station (e.g., a cluster head), then a message is transmitted directly to the target station.

Preferably, each mobile station can select an optimum route (e.g., a route with the "lowest cost") to transmit messages throughout the network, if the station decides to route messages through an affiliated cluster head. To route messages in this manner, each node preferably maintains information regarding network topology. Network topology can include a series of "snapshots" which are issued from each mobile station in the network. These snapshots are routed or flooded through the network by the cluster heads. Preferably, there are two types of snapshots: link-state and affiliation. A cluster head issues link-state snapshots, while a cluster member issues affiliation snapshots. Each snapshot preferably contains information such as current affiliated stations, potential neighbor stations, ID information, network metric information, etc. Mobile stations preferably store snapshot information in databases.

To facilitate routing selection, in one embodiment, a forwarding table is created to express the cost of forwarding messages. Since each mobile station has snapshot databases, a shortest path tree with itself as the root and all other nodes (via affiliated cluster heads) as branches is created. The "length" of each link is given by the metric for that link, and a path metric is the sum of the lengths along that path. Once the tree is constructed, it is possible to generate a forwarding table that optimally indicates which "next-hop" node or which overall path having the lowest cost should be used for any giving destination node. As will be appreciated by those skilled in the art, this calculation can be performed via a shortest-path first algorithm, for example, Dijkstra's algorithm as explained in Chapter 5 of "Routing in Communications Networks," M. Steenstrup, ed., 1995. In this manner, each mobile station can determine a transmission path or a next-hop through any of its affiliated cluster heads to optimally send messages through the network. As will be appreciated by those skilled in the art, many other known routing procedures are suitable to accomplish any required routing.

The individual components shown in outline or designated by blocks in the drawings are all well known in the communications arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Figure 10:
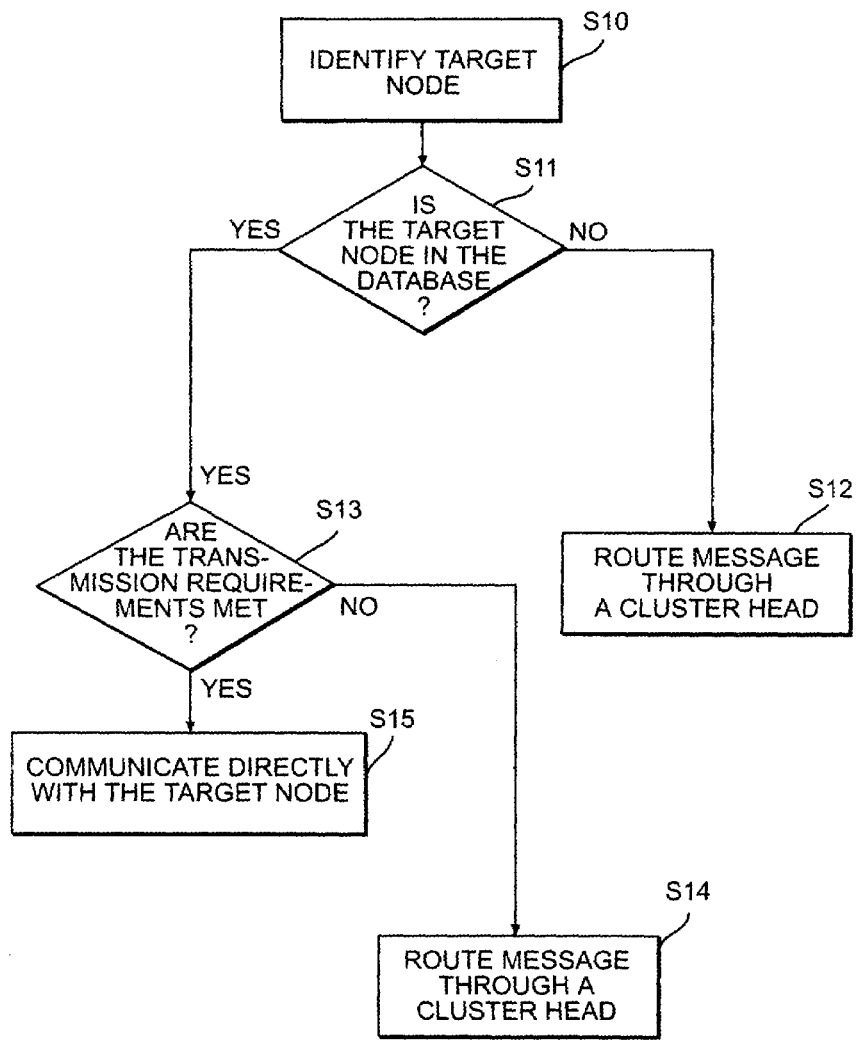
FIG. 10 is a flow diagram illustrating an operational aspect of the present invention.

For example, the step 13 decision in FIG. 10 could be based on other network conditions. In one example, mobile station 2 communicates directly with a target station if the network experiences a high volume of traffic, or if a queue for transmission through a particular node is especially long. Also direct cluster member to cluster member communication could be performed based on a priority of a message. If a message is prioritized as "urgent," for example, direct cluster member to cluster member communication is implemented regardless of network interference.

The preferred embodiments have been described with respect to a mobile station having two power levels. However, as will be appreciated by those skilled in the art, a mobile station that varies transmission power through many levels may be used. In one alternative arrangement, the mobile stations transmit a power level reference with beacon messages, so that a receiving station can calculate an RSSI value. The calculated RSSI value can also be used to determine an appropriate responding power level to ensure a successful transmission. Hence, the concepts of the present invention would apply equally to a mobile station having many power levels.

Also, instead of using a network-wide maximum RSSI value when approximating an area of interference, another appropriate RSSI value could be used. This value could be determined by analyzing allowable interference levels, radio capabilities, etc. Furthermore, RSSI values determined through other known definitions may also be used with the present invention.

As will be appreciated, cluster heads could be configured to transmit cluster beacons on a backbone or local channels, as well as other channels, to increase exposure to the network. Likewise, cluster members are not limited to transmitting member beacons on the local channel, and may transmit member beacons over other such channels, if the mobile stations are so configured. Furthermore, member beacons and member communication messages could be transmitted at the lower power level, or at an intermediate power level according to configurable selections.

Also, whereas FIGS. 8*a* and 8*b* show possible beacon formats, other formats containing different information may be used so long as the issuing nodes are identified.

Whereas FIGS. 2 through 5 and 7 illustrate examples of possible network configurations, they should not be construed as limiting the present invention. Other possible configurations may include a different number of cluster heads, cluster members, and/or affiliation connections, for example.

Also, the present invention is not limited by the specific nodes and beacons used as examples in the above-described procedures. Instead, the procedures are applicable to other various transmission combinations. As will be appreciated by one of ordinary skill in the art, the example procedures could be modified to explicitly account for areas affected by additional transmission hops. Alternatively, the example procedures could still be used even when additional hops are not individually accounted for, according to the above-discussed general strategy.

Also, as will be appreciated by those skilled in the art, the methods, procedures and logic, as described herein, can be embodied in a programmable computer or in computer executable software using known programming techniques. The software can be stored on a computer readable medium, for example, on a floppy disk, RAM, ROM, a hard disk, removable media, flash memory, memory sticks, optical mediums, magneto-optical mediums, CD-ROMs, etc.

Furthermore, instead of removing a beacon from the member database, as suggested in step S4 of FIG. 9, the mobile station could set a "below RSSI threshold" flag. Then, in FIG. 10, the mobile station would communicate directly with the target station listed in the database depending on the flag status. Also, steps S6 through S9 of FIG. 9 could be replaced with a single step of writing all information from a received member beacon.

What is claimed:

1. A first mobile communications station configured for use in a communications network connecting at least one cluster of communications stations, wherein a cluster has a communications station operating as a cluster head for directing communications within and among the clusters, said first mobile communications station comprising:
   an electronic memory circuit having network information stored therein;
   a transceiver which transmits signals to and receives signals from the communications stations in the network; and
   an electronic processor circuit configured to (i) determine the strength of a signal received from a second communications station through said transceivers, and (ii) determines whether to communicate with the second communications station directly or to communicate with the second communications station by routing messages through cluster head affiliated to said first mobile communications station based on the signal strength.

2. A first mobile communications station according to claim 1, wherein the determination of whether to communicate with the second communications station directly or to communicate with the second communications station by routing messages through a cluster head affiliated to first mobile communications station comprises evaluating network bandwidth.

3. A first mobile communications station according to claim 1, wherein the stored network information comprises received member beacon information.

4. A first mobile communications station according to claim 1, wherein said electronic processor circuit determines a communications route based on at least one of a transmission power level of an affiliated cluster head, a required transmission power level to transmit to the second communications station, node congestion of the affiliated cluster head, and bandwidth optimization.

5. A first mobile communications station for use in a communications network connecting at least one cluster of communications stations, wherein a cluster includes a cluster head for directing communications within and among the clusters, said first mobile communications station comprising:
   an electronic memory circuit having network information stored therein;
   a transceiver which transmits signals to and receives signals from mobile stations in the network; and
   an electronic processor circuit configured to (i) determine a received signal strength indicator (RSSI) for a second communications station of the plurality of mobile stations based on the signal strength of a member beacon received from the second communications station through said transceiver, (ii) determines a RSSI for a cluster head affiliated with the mobile communication station based on the strength of a signal received by the mobile communication system through said receiver; and (iii) communicates with the second communications station directly when the RSSI of the second communications station is greater than the RSSI of the affiliated cluster head plus an additional value.

6. A first mobile communications station according to claim 5, wherein the additional value comprises a fraction of a maximum RSSI of the affiliated cluster head.

7. A first mobile communications station according to claim 5, wherein the additional value comprises one-half of the maximum RSSI of the affiliated cluster head.

8. A first mobile communications station according to claim 5, wherein the second communications station and said mobile communications station are affiliated to a same cluster.

9. A first mobile communications station according to claim 5, wherein the second communications station and said mobile communications station are affiliated to a different cluster.

10. A first mobile communications station according to claim 5, wherein said electronic processor circuit determines at least one network cost and said mobile communications station directly communicates with the second communications station when the member beacon RSSI of the second communications station is greater than an RSSI of the affiliated cluster head plus an adjusted value minus the cost.

11. A first mobile communications station according to claim 5, wherein said electronic processor circuit executes a handshake protocol with the second communications station.

12. A first mobile communications station according to claim 11, wherein a communications link with the second communications station is maintained.

13. In a communications network including at least one cluster of communications stations, wherein a cluster includes a cluster head for directing communication within and among the clusters, a method of operating a first mobile communications station comprising:
   receiving a beacon message each from a second communications station and a cluster head affiliated with the first mobile communications station;
   evaluating the signal strength of the beacon messages; and
   determining whether to directly communicate with the second communications station or to communicate with the second communications station by forwarding messages through the cluster head affiliated with the first mobile communication station based on the evaluation of said beacon messages.

14. Computer executable code stored on a computer readable medium, the code for operating a first mobile communications station in a communications network which includes at least one cluster of communications stations, wherein a cluster includes a cluster head for directing communication within and among the clusters, the computer executable code comprising:
code to evaluate the signal strength of a beacon received by the first mobile communications station from a second communications station;
code to direct messages, based on an evaluation of said evaluation code, from the first mobile communications device to the second communications station (i) through an affiliated cluster head, or (ii) directly to the second communications station.

15. In a communications network including at least one cluster of communications stations, wherein a cluster includes a cluster head for directing communication within and among the clusters, a method for configuring the network comprising:
receiving a beacon issued by a first communications station at a second communication station;
determining a received signal strength indicator (RSSI) based on the strength of the beacon signal;
comparing the received signal strength indicator (RSSI) of the received beacon with a predetermined RSSI value; and
determining whether the second member station should communicate directly with the first communications station based at least in part on the comparison of said comparing step.

16. In a communications network including at least one cluster of communications stations, wherein a cluster includes a cluster head for directing communication within and among the clusters, a method of operating a first communications station so as to route a message to a second communications station:
receiving a signal from the second communications station and determining a received signal strength (RSSI1) for the signal based on the strength of the received signal, and;
receiving a signal from an affiliated cluster head and determining a received signal strength (RSSI2) for the signal based on the strength of the received signal;
determining a value (X) representing a relationship between a maximum received signal strength and a received signal strength for a signal between the second communications station and the affiliated cluster head; and
transmitting a signal directly to the second communications station when:
RSSI1>RSSI2−X.

17. The method according to claim 16, wherein the message to be sent to the second communications station is relayed through the affiliated cluster head when the condition RSSI1>RSSI2−X is not met.

18. The method according to claim 16, wherein the signal from the second communications station is discarded when RSSI1 is below a predetermined value and the message to be sent to the first mobile station is relayed through the affiliated cluster head.

19. The method according to claim 16, wherein the relationship of said determining step is the maximum received signal strength minus the received signal strength for a signal between the second communications station and the affiliated cluster head.

20. The method according to claim 16, wherein the relationship of said determining step is approximated by the maximum received signal strength minus a fraction of the maximum received signal strength.

21. The method according to claim 16, wherein the relationship of said determining step is approximated by the maximum received signal strength minus one-half of the maximum received signal strength.

22. A first mobile communications station for use in a communications network connecting at least one cluster of communications stations, wherein a cluster includes a cluster head for directing communications within and among the clusters, said mobile communications station comprising:
an electronic memory circuit having network information stored therein;
a transceiver which transmits signals to and receives signals from other communications stations in the network; and
an electronic processor circuit configured to determine whether a second communications station is within one radio hop from the first mobile communications station and to (i) communicate directly with the second communications station if the second communications station is determined to be within one radio hop; or (ii) communicate with the second communications station through a cluster head if the second communications station is determined to not be within one radio hop from the first mobile communications station.

23. A first mobile communications station according to claim 22, wherein the second communications station and the first mobile communications station are affiliated to a same cluster.

24. A first mobile communications station according to claim 22, wherein the second communications station and the first mobile communications station are affiliated to different clusters.

25. A first mobile communications station according to claim 22, wherein said electronic processor circuit executes a handshake protocol with the second communications station.

26. A first mobile communications station according to claim 25, wherein a communications link with the second communications station is maintained.

27. A first mobile communications station according to claim 22, wherein the determination by said electronic processor circuit comprises evaluating a received member beacon from the second communications station.

28. A mobile communications station according to claim 27, wherein the determination by said electronic processor circuit further comprises evaluating a received signal strength indicator (RSSI) of the received member beacon.

29. A first mobile communications station according to claim 28, wherein said electronic processor circuit directs a message intended for the second communications station via an affiliated cluster head when the RSSI of the received member beacon from the second communications station is below a predetermined threshold value.

30. A first mobile communications station according to claim 1, wherein the determination by said electronic processor circuit further comprises evaluating a signal from a cluster head affiliated with the first mobile communications station.

31. A first mobile communications station according to claim 30, wherein said electronic processor circuit evaluates an RSSI of the signal from the affiliated cluster head.

32. A first mobile communications station according to claim 27, wherein the determination by said electronic processor circuit further comprises evaluating a received signal strength indicator (RSSI) of the received member beacon.

33. In a communications network including at least one cluster of communications stations, wherein a cluster includes a cluster head for directing communication within and among the clusters, a method of operating a first mobile communications station comprising:
- determining whether a second communications station in the network is within one radio hop from the first mobile communications system;
- communicating directly with the second communications station if the first mobile communications station is determined to be within one radio hop; and
- communicating with the second communications station through a cluster head if the second communications station is determined to not be within one radio hop from the first mobile communications station.

34. A method of operating a communications station according to claim 33 comprising:
- receiving a beacon message from the second communications station; and
- evaluating the signal strength of the beacon message; and
- wherein the determining of whether the second communication station is within one radio hop from the first mobile communications station is based on the signal strength evaluation.

35. Computer executable code stored on a computer readable medium, the code for operating a first mobile communications station in a communications network which includes at least one cluster of communications stations, wherein a cluster includes a cluster head for directing communication within and among the clusters, the computer executable code comprising:
- code for determining whether the second communications station is within one radio hop from the communications station; and
- code to direct messages (i) directly to the second communications station if the second communications station is within one radio hop of the first communications station and (ii) to the second communications station through an affiliated cluster head if the second communications station is not within one radio hop of the communications station.

36. Computer executable code stored on a computer readable medium according to claim 29 comprising:
- code for evaluating a signal strength of beacon message received from the second communications station; and
- wherein the determining of whether the second communication station is within one radio hop from the first mobile communications station is based on the signal strength evaluation.

\* \* \* \* \*